US012213062B2

(12) United States Patent
Xu (10) Patent No.: US 12,213,062 B2
(45) Date of Patent: Jan. 28, 2025

(54) METHOD AND APPARATUS FOR NOTIFYING APPLICATION FUNCTION NODE ABOUT RDS CONFIGURATION OF NETWORK

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 788 days.

(21) Appl. No.: 17/295,130

(22) PCT Filed: Jun. 12, 2019

(86) PCT No.: PCT/CN2019/090952
§ 371 (c)(1),
(2) Date: May 19, 2021

(87) PCT Pub. No.: WO2020/103432
PCT Pub. Date: May 28, 2020

(65) Prior Publication Data
US 2022/0007278 A1    Jan. 6, 2022

(30) Foreign Application Priority Data
Nov. 19, 2018   (WO) ................ PCT/CN2018/116155

(51) Int. Cl.
*H04W 48/18* (2009.01)
*H04W 8/22* (2009.01)
(Continued)

(52) U.S. Cl.
CPC ............. *H04W 48/18* (2013.01); *H04W 8/22* (2013.01); *H04W 24/02* (2013.01); *H04W 80/00* (2013.01); *H04W 88/18* (2013.01)

(58) Field of Classification Search
None
See application file for complete search history.

(56) References Cited

U.S. PATENT DOCUMENTS

| 7,865,535 B2 | 1/2011 | Brodsky et al. |
| 2017/0317894 A1* | 11/2017 | Dao .................... H04L 41/5009 |

(Continued)

FOREIGN PATENT DOCUMENTS

| WO | 2017070383 A1 | 4/2017 | |
| WO | WO-2018144249 A1 * | 8/2018 | ............ H04W 16/14 |

(Continued)

OTHER PUBLICATIONS

Author Unknown, "Technical Specification Group Services and System Aspects; Study on Cellular IoT support and evolution for the 5G System (Release 16)," Technical Report 23.724, Version 0.5.0, Jul. 2018, 3GPP Organizational Partners, 218 pages.

(Continued)

*Primary Examiner* — Christopher T Wyllie
(74) *Attorney, Agent, or Firm* — Withrow & Terranova, PLLC (57) ABSTRACT

The present disclosure provides a method and an apparatus for notifying an application function node about a reliable data service (RDS) configuration of a network. The method implemented at an exposure function node includes: obtaining an RDS configuration of a terminal device; determining an RDS capability of a network; and sending a message including information about the RDS capability of the network to the application function node, if the RDS capability of the network is changed. The RDS capability of the network indicates whether the network supports the RDS. The method implemented at an application function node includes: receiving, from an exposure function node, a message including information about the RDS of the network, if the RDS capability of the network is changed. Data (Continued)

transmissions of the application function node with improper configuration may be avoided.

1 Claim, 8 Drawing Sheets

(51) Int. Cl.
 *H04W 24/02* (2009.01)
 *H04W 80/00* (2009.01)
 *H04W 88/18* (2009.01)

(56) References Cited

U.S. PATENT DOCUMENTS

| | | | | |
|---|---|---|---|---|
| 2019/0261453 | A1* | 8/2019 | Jain | H04W 8/183 |
| 2019/0306251 | A1* | 10/2019 | Talebi Fard | H04W 76/10 |
| 2020/0100319 | A1* | 3/2020 | Talebi Fard | H04W 4/90 |
| 2020/0288515 | A1* | 9/2020 | Gupta | H04W 48/02 |
| 2021/0120377 | A1* | 4/2021 | Mahalank | H04W 76/11 |
| 2021/0136651 | A1* | 5/2021 | Gholmieh | H04W 48/17 |
| 2021/0168643 | A1* | 6/2021 | Yao | H04W 24/08 |
| 2022/0007278 | A1* | 1/2022 | Xu | H04W 48/18 |
| 2023/0247691 | A1* | 8/2023 | Xu | H04W 40/24 370/329 |

FOREIGN PATENT DOCUMENTS

| | | | | |
|---|---|---|---|---|
| WO | 2018200218 | A1 | 11/2018 | |
| WO | WO-2020103432 | A1 * | 5/2020 | H04L 67/02 |

OTHER PUBLICATIONS

Notice of Submission of Opinion for Korean Patent Application No. 10-2021-7018914, mailed May 30, 2022, 10 pages.
Ericsson, "C3-185312: Correct group NIDD procedure," 3GPP TSG-CT WG3 Meeting #98, Aug. 20-24, 2018, West Palm Beach, Florida, 21 pages.
Intel, "C1-175329: Support for Reliable Data Service with PIP SGi Tunneling," 3GPP TSG-CT WG1 Meeting #107, Nov. 27-Dec. 1, 2017, Reno, Nevada, 3 pages.
Extended European Search Report for European Patent Application No. 19886208.8, mailed Jul. 5, 2022, 14 pages.
Examination Report for Indian Patent Application No. 202147026563, mailed Mar. 17, 2022, 5 pages.
Convida Wireless LLC, "S2-177804: Reliable Data Service Configuration," 3GPP TSG-SA WG2 Meeting #123, Oct. 23-27, 2017, Ljublijana, Slovenia, 9 pages.
Convida Wireless LLC, "S2-177959: Reliable Data Service Configuration," 3GPP TSG-SA WG2 Meeting #123, Oct. 23-27, 2017, Ljublijana, Slovenia, 9 pages.
First Office Action for Chinese Patent Application No. 201980075912. 6, mailed Oct. 12, 2023, 8 pages.
Request for the Submission of an Opinion for Korean Patent Application No. 10-2023-7010436, mailed Aug. 22, 2023, 4 pages.
Author Unknown, "Technical Specification Group Services and System Aspects; Architecture enhancements to facilitate communications with packet data networks and applications (Release 15)," Technical Specification 23.682, Version 15.6.0, 3GPP Organizational Partners, Sep. 2018, 125 pages.
Author Unknown, "Technical Specification Group Services and System Aspects; Architecture enhancements to facilitate communications with packet data networks and applications (Release 16)," Technical Specification 23.682, Version 16.0.0, 3GPP Organizational Partners, Sep. 2018, 126 pages.
Author Unknown, "Technical Specification Group Core Network and Terminals; T8 reference point for Northbound APIs; (Release 15)," Technical Specification 29.122, Version 15.1.0, 3GPP Organizational Partners, Sep. 2018, 273 pages.
Author Unknown, "Technical Specification Group Core Network and Terminals; 5G System; Network Exposure Function Northbound APIs; Stage 3 (Release 15)," Technical Specification 29.522, Version 15.1.0, 3GPP Organizational Partners, Sep. 2018, 29 pages.
International Search Report and Written Opinion for International Patent Application No. PCT/CN2019/090952, mailed Sep. 10, 2019, 10 pages.

* cited by examiner

METHOD AND APPARATUS FOR NOTIFYING APPLICATION FUNCTION NODE ABOUT RDS CONFIGURATION OF NETWORK

This application is a 35 U.S.C. § 371 national phase filing of International Application No. PCT/CN2019/090952, filed Jun. 12, 2019, which claims the benefit of International Application No. PCT/CN2018/116155, filed Nov. 19, 2018, the disclosures of which are incorporated herein by reference in their entireties.

TECHNICAL FIELD

The present disclosure relates generally to the technology of communications, and in particular, to a method and an apparatus for notifying an application function node about a reliable data service (RDS) configuration of the network.

BACKGROUND

In a communication system, non-IP technology (with the data considered as unstructured from the evolved packet system (EPS) standpoint) is used to reduce the occupation of network resources, such as internet protocol (IP) addresses. With this non-IP technology, a terminal device, such as a user equipment (UE) does not need an IP address to exchange data with the network. The non-IP data delivery (NIDD) may be used to handle both mobile originated (MO) and mobile terminated (MT) communication with UEs, wherein "MO" and "MT" are considered from the evolved packet system (EPS) standpoint.

A non-IP data delivery (NIDD) may be implemented between an application function node and a UE, via an exposure function node in the communication system. The application function node may be a service capability server or an application server (SCS/AS) or an application function (AF) node device, etc. The exposure function node may be a service capability exposure function (SCEF) node, or a network exposure function (NEF) node, etc. An association between the SCS/AS and a Packet Data Network (PDN) Connection to the SCEF may be established to enable transfer of non-IP data between the UE and the SCS/AS.

In non-IP technology, a Reliable Data Service (RDS) provides a mechanism for the SCEF to determine if the data was successfully delivered to the UE and for UE to determine if the data was successfully delivered to the SCEF. When a requested acknowledgement is not received, the Reliable Data Service retransmits the packet. The service is enabled or disabled based on Access Point Name (APN) Configuration per service level agreement (SLA).

When the service is enabled, a protocol is used between the end-points of the Non-IP PDN Connection. The protocol uses a packet header to identify if the packet requires no acknowledgement, requires an acknowledgement, or is an acknowledgment and to allow detection and elimination of duplicate packet data units (PDU) at the receiving endpoint. Port Numbers in the header are used to identify the application on the originator and to identify the application on the receiver.

The UE may indicate its capability of supporting Reliable Data Service to the SCEF. If SCEF supports and accepts Reliable Data Service then it indicates to the UE that the Reliable Data Service shall be used if enabled in the APN configuration.

SUMMARY

However, an application function node, which utilizes the RDS service, might not obtain the information about the network's current capability of supporting Reliable Data Service, and thus might transmit data with improper configuration. It is therefore an object of embodiments of the present disclosure to provide a method and an apparatus for notifying an application function node about a reliable data service (RDS) configuration of the network, particularly if the RDS capability of the network is changed.

According to a first aspect of the disclosure, there is provided a method implemented at an exposure function node. The method comprises: obtaining an RDS configuration of a terminal device; determining an RDS capability of a network; and sending a message including information about the RDS capability of the network to the application function node, if the RDS capability of the network is changed. The RDS capability of the network indicates whether the network supports the RDS.

In embodiments of the present disclosure, wherein determining the RDS capability of the network comprises: determining that the network supports the RDS, when the terminal device is not connected; or determining that the network does not support the RDS, when the terminal device is connected and indicates no support for RDS.

In embodiments of the present disclosure, sending a message including information about the RDS capability to the application function node, if the RDS capability of the network is changed comprises: sending a message including an RDS capability indication to the application function node, when the terminal device is connected and indicates no support for RDS; wherein the exposure function node previously notified the application function node that the network supports the RDS.

In embodiments of the present disclosure, the exposure function node previously notified the application function node that the network supports the RDS, when the terminal device was not connected.

In embodiments of the present disclosure, the RDS capability of the network is determined, based on the RDS configuration of the terminal device and an RDS configuration of the exposure function node, when the terminal device is connected.

In embodiments of the present disclosure, the RDS capability of the network is determined, based on an RDS configuration of the exposure function node, when the terminal device is not connected.

In embodiments of the present disclosure, the message comprises: an information element of a boolean type. A value of the information element indicates that the network supports the RDS, and another value of the information element indicates that the network does not support the RDS.

In embodiments of the present disclosure, the message further indicates at least one of: a non internet protocol data delivery (NIDD) status about the terminal device; a NIDD configuration status about the terminal device; and a NIDD group data delivery status about a plurality of terminal devices including the terminal device.

In embodiments of the present disclosure, the message comprises at least one of: NiddDownlinkDataDeliverySta­tusNotification if the message indicates a NIDD downlink data delivery status; NiddConfigurationStatusNotification if the message indicates the NIDD configuration status; GmdResult if the message indicates the NIDD group data delivery status.

In embodiments of the present disclosure, the message comprises information about whether the terminal device enforces the RDS, if the message indicates the NIDD status; or whether each terminal device of the plurality of the terminal devices enforces the RDS, if the message indicates the NIDD group data delivery status.

In embodiments of the present disclosure, the message is a hyper text transfer protocol (HTTP) POST message.

In embodiments of the present disclosure, the RDS configuration is obtained upon a communication with the terminal device.

In embodiments of the present disclosure, the RDS configuration is obtained by analyzing protocol configuration options (PCO).

In embodiments of the present disclosure, the PCO comprises an indication of a capability of the terminal device for supporting RDS. The exposure function node determines whether the network supports the RDS, based on the indication of the capability of the terminal device for supporting RDS and own RDS capability.

In embodiments of the present disclosure, the method further comprises: comparing a current determination of whether the network supports the RDS with a previously determined record of whether the network supports the RDS. The exposure function node sends the message if the current determination is different with the previously determined and stored record.

In embodiments of the present disclosure, the application function node is a service capability server/application server (SCS/AS) node.

In embodiments of the present disclosure, the terminal device comprises a user equipment (UE).

In embodiments of the present disclosure, the exposure function node comprises: a service capability exposure function (SCEF) node, or a network exposure function (NEF) node.

In embodiments of the present disclosure, the method comprises: determining an RDS capability of a network, indicating a support for RDS; sending a message including information about the RDS capability of the network to an application function node; obtaining an RDS configuration of a terminal device if the terminal device is connected, wherein the RDS configuration of the terminal device indicates no support for RDS; determining that the capability of the network is changed, based on the RDS configuration of the exposure function node, and the RDS configuration of the terminal device; and sending a message including information about the changed RDS capability of the network to the application function node.

In embodiments of the present disclosure, there is provided another method implemented at an exposure function node. The method comprises: determining an RDS capability of a network, wherein the RDS capability of the network indicates whether the network supports the RDS; sending a first message including information about the RDS capability of the network to an application function node; obtaining an RDS configuration of a terminal device when the terminal device is connected, wherein the RDS configuration of the terminal device indicates no support for RDS; determining that the capability of the network is changed, based on the RDS configuration of the exposure function node, and the RDS configuration of the terminal device; and sending a second message including information about the changed RDS capability of the network to the application function node.

In embodiments of the present disclosure, each of the first message and the second message comprise: an information element of a boolean type; and a value of the information element indicates that the network supports the RDS, and another value of the information element indicates that the network does not support the RDS.

In embodiments of the present disclosure, each of the first message and the second message is a hyper text transfer protocol (HTTP) POST message.

In embodiments of the present disclosure, the RDS configuration is obtained upon a communication with the terminal device.

In embodiments of the present disclosure, the application function node is a service capability server/application server (SCS/AS) node.

In embodiments of the present disclosure, the terminal device comprises a user equipment (UE).

In embodiments of the present disclosure, the exposure function node comprises: a service capability exposure function (SCEF) node, or a network exposure function (NEF) node.

According to a second aspect of the disclosure, there is provided a method implemented at an application function node. The method comprises: receiving, from an exposure function node, a message including information about an RDS capability of a network, if the RDS capability of the network is changed. The RDS capability of the network indicates whether the network supports the RDS.

In embodiments of the present disclosure, receiving, from an exposure function node, a message including information about an RDS capability of a network, if the RDS capability of the network is changed comprises: receiving, from the exposure function node, a message including an RDS capability indication, when the terminal device is connected and indicates no support for RDS; wherein the application function node previously received from the exposure function node that the network supports the RDS.

In embodiments of the present disclosure, the RDS capability of the network is determined, by the exposure function node, based on the RDS configuration of the terminal device and an RDS configuration of the exposure function node, when the terminal device is connected; or the RDS capability of the network is determined, by the exposure function node, based on an RDS configuration of the exposure function node, when the terminal device is not connected.

In embodiments of the present disclosure, the message comprises: an information element of a boolean type. A value of the information element indicates that the network supports the RDS, and another value of the information element indicates that the network does not support the RDS.

In embodiments of the present disclosure, the message further indicates at least one of: a non internet protocol data delivery (NIDD) status about the terminal device; a NIDD configuration status about the terminal device; and a NIDD group data delivery status about a plurality of terminal devices including the terminal device.

In embodiments of the present disclosure, the message comprises at least one of: NiddDownlinkDataDeliveryStatusNotification if the message indicates a NIDD downlink data delivery status; NiddConfigurationStatusNotification if the message indicates the NIDD configuration status; and GmdResult if the message indicates the NIDD group data delivery status.

In embodiments of the present disclosure, the message comprises information about whether the terminal device enforces the RDS, if the message indicates the NIDD status; or whether each terminal device of the plurality of the terminal devices enforces the RDS, if the message indicates the NIDD group data delivery status.

In embodiments of the present disclosure, the message is a hyper text transfer protocol (HTTP) POST message.

In embodiments of the present disclosure, the application function node is a service capability server/application server (SCS/AS) node.

In embodiments of the present disclosure, the terminal device comprises a user equipment (UE).

In embodiments of the present disclosure, the exposure function node comprises: a service capability exposure function (SCEF) node, or a network exposure function (NEF) node.

According to a third aspect of the disclosure, there is provided an exposure function node, comprising: a processor; and a memory, containing instructions executable by the processor. The exposure function node is operative to: obtain an RDS configuration of a terminal device; determine an RDS capability of a network; and send a message including information about the RDS capability of the network to an application function node, if the RDS capability of the network is changed. The RDS capability of the network indicates whether the network supports the RDS.

In embodiments of the present disclosure, the exposure function node is operative to any of the methods above mentioned.

According to a fourth aspect of the disclosure, there is provided an application function node, comprising: a processor; and a memory, containing instructions executable by the processor. The application function node is operative to: receive, from an exposure function node, a message including information about whether the network supports the RDS, if the RDS capability of the network is changed.

In embodiments of the present disclosure, the application function node is operative to any of the methods above mentioned.

According to a fifth aspect of the disclosure, there is provided an exposure function node, comprising: an obtainment unit, configured to obtain a RDS configuration of a terminal device; a determination unit, configured to determine whether the network supports the RDS; and a transmission unit, configured to send a message including information about whether the network supports the RDS to an application function node, if the RDS capability of the network is changed. The RDS capability of the network indicates whether the network supports the RDS.

In embodiments of the present disclosure, the exposure function node is operative to any of the methods above mentioned.

According to a sixth aspect of the disclosure, there is provided an application function node, comprising: a transmission unit, configured to receive, from an exposure function node, a message including information about whether the network supports the RDS, if the RDS capability of the network is changed.

In embodiments of the present disclosure, the application function node is operative to any of the methods above mentioned.

According to a seventh aspect of the disclosure, there is provided a device readable storage medium having a program stored thereon, wherein the program is executable by a device to cause the device to carry out the method above mentioned.

According to the present disclosure, the exposure function node sends message to notify the application function node about a reliable data service (RDS) configuration of the network, upon the obtainment of the RDS configuration of the terminal device. It is an advantage that data transmissions of the application function node with improper configuration may be avoided.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5b is a diagram showing an exemplary implementation procedure for the method as shown in FIG. 5a;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

Further, term "network node" or "network side node" may also refer to a network device with core network function. The network node may include an exposure function node, such as a service capability exposure function (SCEF) node, or a network exposure function (NEF) node or etc., which exposes the function of the core network to an application function node, such as a service capability server/application server (SCS/AS), etc.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
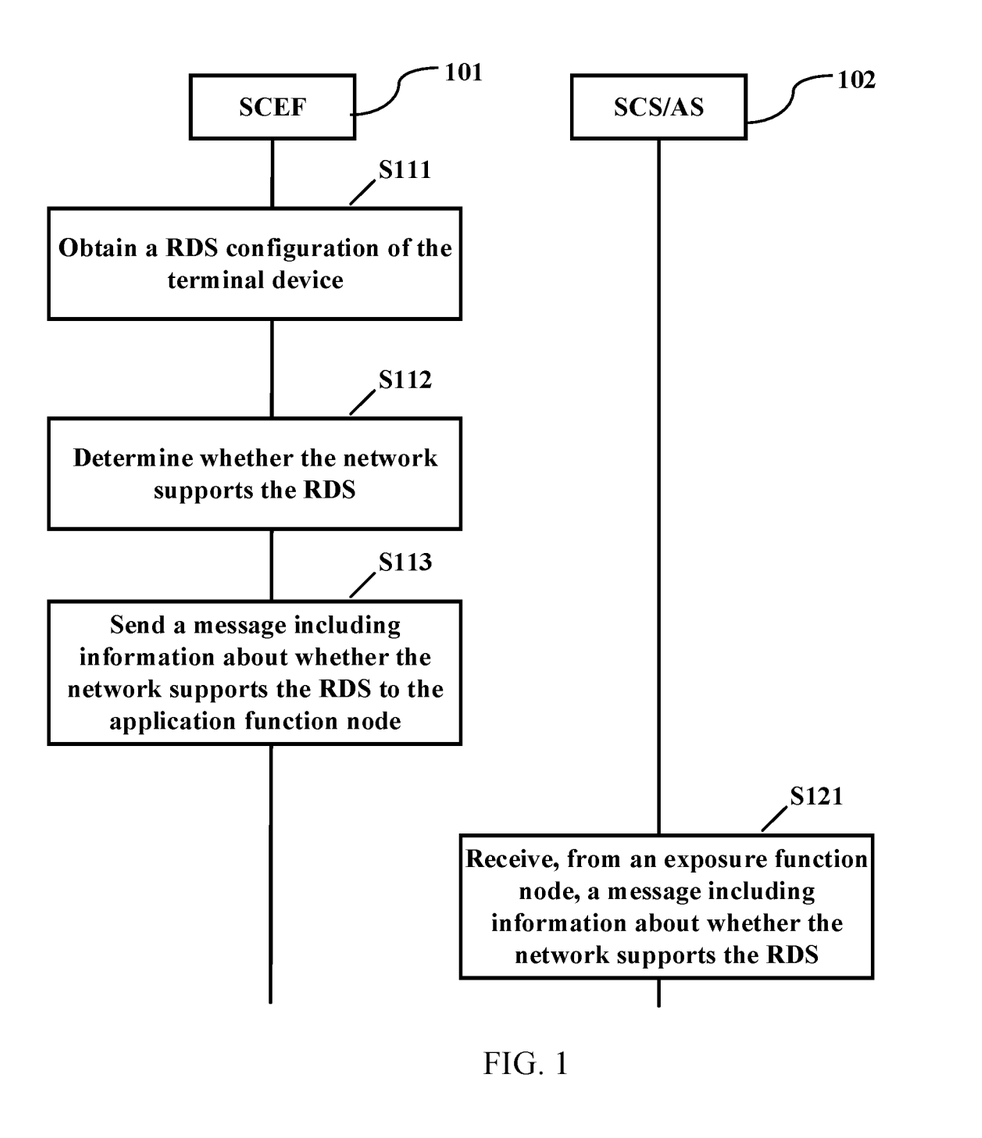
FIG. 1 is an exemplary procedure diagram illustrating methods for notifying an application function node about RDS configuration of the network.

FIG. 1 is an exemplary procedure diagram illustrating methods for notifying an application function node about RDS configuration of the network.

As shown in FIG. 1, a method implemented at an exposure function node, such as SCEF 101, includes: step S111, obtaining an RDS configuration of the terminal device; step S112, determining an RDS capability of the network, namely, whether the network supports the RDS; and step S113, sending a message including information about whether the network supports the RDS to the application function node. It should be understood the SCEF is not a limitation to the present disclosure, other exposure function node such as a network exposure function (NEF) node may also be applicable.

In embodiments of the present disclosure, whether the network supports the RDS is determined, based on the RDS configuration of the terminal device and an RDS configuration of the exposure function node.

From the perspective of the application function node, the whole network may have a meaning including a core network in the communication system and the terminal device. The exposure function node exposes the functions/service, such as RDS, provided by the core network to the application function node. The RDS configuration of the exposure function node indicates whether the core network supports, or allows the RDS to the application function node. If the network supports the RDS to the application function node (i.e. both the core network supports/allows the RDS, and the terminal device supports the RDS), the application function node can utilize the RDS properly during a communication with the terminal device via the core network.

Correspondingly, a method implemented at an application function node, such as SCS/AS 102, includes: step S121, receiving, from an exposure function node, a message including information about whether the network supports the RDS. It should be understood the SCS/AS is not a limitation to the present disclosure, any other function node, which requests notification from the exposure function node, may also be applicable.

In embodiments of the present disclosure, the exposure function node sends message to notify the application function node about a reliable data service (RDS) configuration of the network, upon the obtainment of the RDS configuration of the terminal device. If any one of the exposure function node and the terminal device is configured to not support the RDS, the application function node will receive the notification that the network does not support the RDS. If the configurations of both the terminal device and the exposure function node support the RDS, the application function node will receive the notification that the network supports the RDS. It is an advantage that data transmissions of the application function node with improper configuration may be avoided.

In embodiments of the present disclosure, the RDS configuration may be obtained upon a communication with the terminal device, such as a communication during attach procedure, or PDN connectivity procedure or Packet Data Protocol (PDP) context Activation procedure.

In embodiments of the present disclosure, the RDS configuration is obtained by analyzing protocol configuration options (PCO). The PCO is transmitted during the communication with the terminal device, and includes an indication of a capability of the terminal device for supporting RDS. The exposure function node determines whether the terminal device supports the RDS, based on the indication of the capability of the terminal device for supporting RDS.

Specifically, the UE may indicate its capability of supporting Reliable Data Service in the Protocol Configuration Options (PCO) to the SCEF 101. If SCEF 101 supports and accepts Reliable Data Service then it indicates to the UE, in the PCO, that the Reliable Data Service shall be used if enabled in the APN configuration.

In embodiments of the present disclosure, the message includes: an information element of a boolean type. A value of the information element indicates that the network supports the RDS, and another value of the information element indicates that the network does not support the RDS.

For example, the information element may have a name of "rdsIndication", a value "True" may indicate that the network supports the RDS, and another value "False" may indicate that the network does not support the RDS. It should be understood the information element may have any other name, or any other type with more than one value. For example, the information element may be a numeric type with values of "0" and "1", or a string type, or a character type, etc.

The above mentioned message may be any kind of message, and may be sent at any time period. Some exemplary application circumstance may be illustrated as follows.

Figure 2:
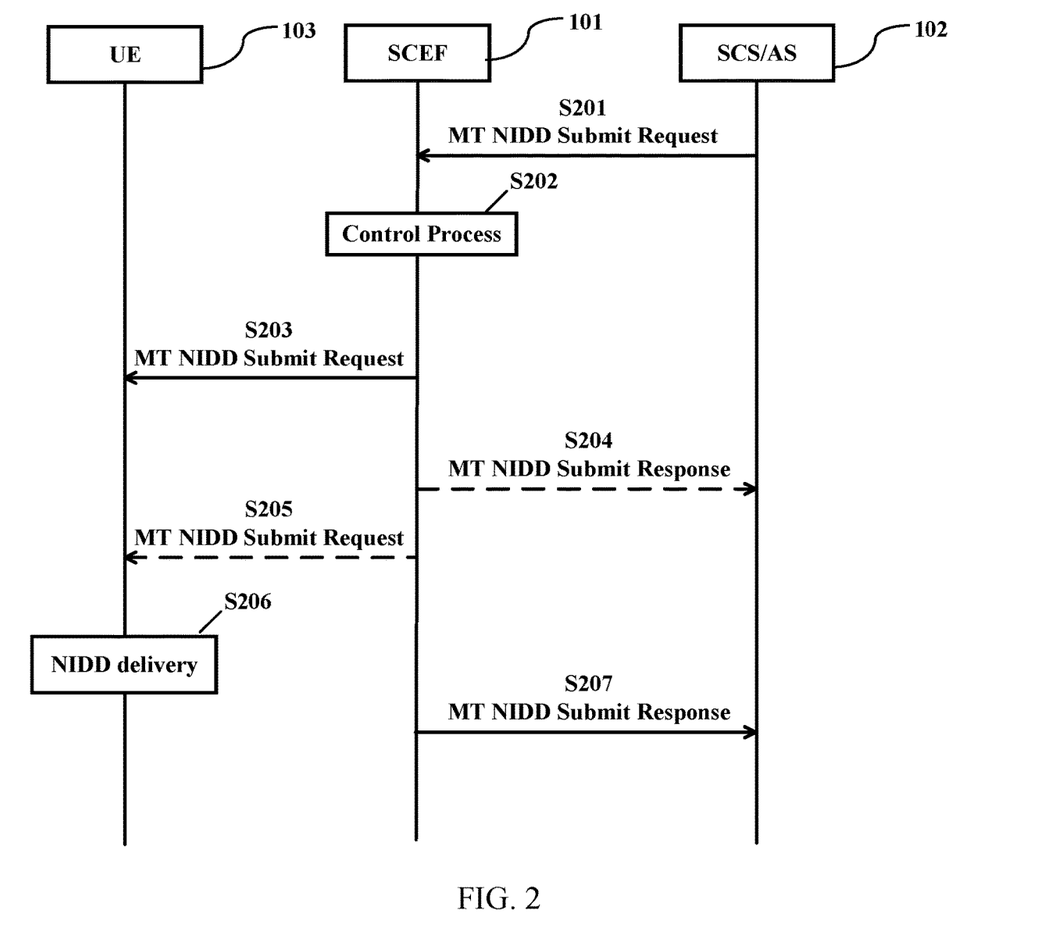
FIG. 2 is an exemplary procedure diagram illustrating a MT NIDD procedure.

FIG. 2 is an exemplary procedure diagram illustrating a mobile terminated (MT) NIDD procedure. As shown in FIG. 2, the MT NIDD procedure includes following steps.

In step S201, the SCS/AS 102 sends a MT NIDD Submit Request message to the SCEF. In step S202, the SCEF 101 preforms a control process for the NIDD. In step S203, the SCEF 101 request MT NIDD submit to the UE 103, through a base station or etc. If the UE 103 does not receive the NIDD delivery, the SCEF 101 may sends a response including failure information to the SCS/AS 102 in step S204, and then send another request to the UE 103 in step S205. If the UE 103 receives the NIDD delivery, such as in step S206, the SCEF 101 will send a response including success information to SCS/AS 102 in step S207. Without limitation to the present disclosure, other detailed examples about MT NIDD procedure may be also found in clause 5.13.3 in a 3rd Generation Partnership Project Technical Specification (3GPP TS) 23.682 V16.0.0 (Release 16).

In steps S204, and S207, the response messages include NIDD status about the terminal device. These messages may also be used as to notify the application function node, such as SCS/AS 102 about a reliable data service (RDS) configuration of the network.

In embodiments of the present disclosure, if the message indicates a NIDD downlink data delivery status, the message may be named "NiddDownlinkDataDeliveryStatusNotification", as in 3GPP TS 29.122 V15.1.0 (Release 15). In embodiments of the present disclosure, a definition of the "NiddDownlinkDataDeliveryStatusNotification" is further illustrated as in the following table. The message may be sent in steps S204 and/or S207.

TABLE 1

Definition of "NiddDownlinkDataDeliveryStatusNotification"

| Attribute name | Data type | Cardinality | Description |
| --- | --- | --- | --- |
| niddDownlinkDataTransfer | Link | 1 | Link to the NIDD downlink data transfer resource to which this notification is related. |
| deliveryStatus | DeliveryStatus | 1 | Indicates the MT NIDD delivery status. |
| rdsIndication | boolean | 0 . . . 1 | It indicates whether a reliable data service acknowledgement is used or not. |
| requestedRetransmissionTime | DateTime | 0 . . . 1 | Identifies the absolute time at which the UE will be reachable. This parameter may be supplied by the SCEF for delivery status "FAILURE_TEMORARILY_NOT_REACHABLE" |

As shown in the table 1, besides the delivery status, the information element (ID) of "rdsIndication" is also included to notify the application function node, such as the SCS/AS 102, about a reliable data service (RDS) configuration of the network.

It is an advantage that existing procedure and message may be utilized directly or only with minor modification in the embodiments. Thus, extra radio or time cost may be minimized.

Figure 3:
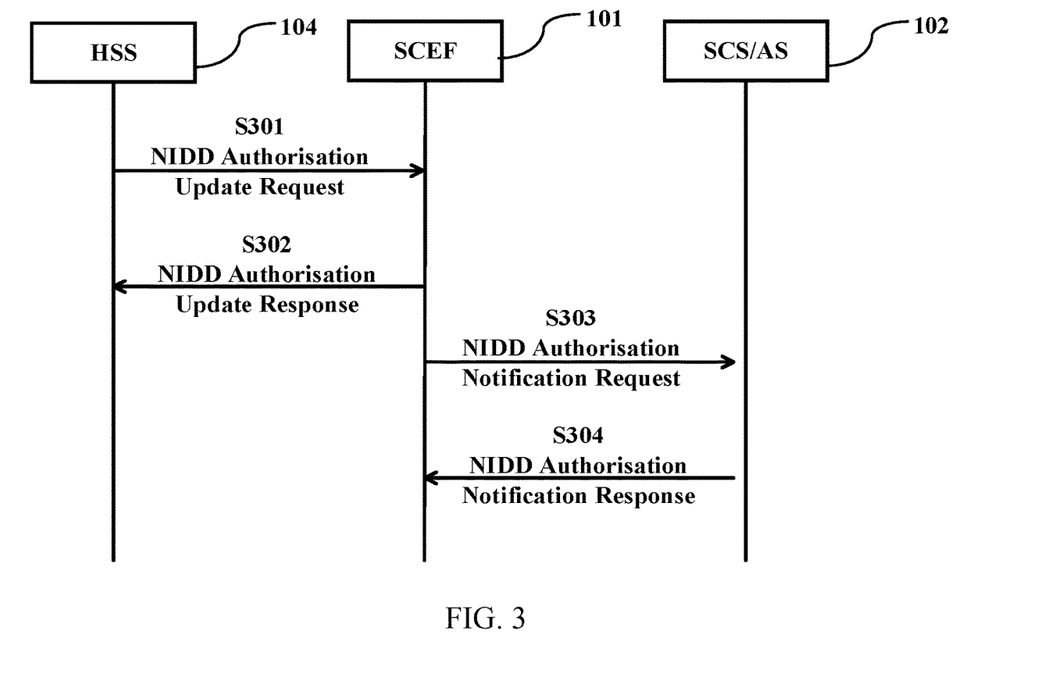
FIG. 3 is an exemplary procedure diagram illustrating a NIDD authorisation update procedure.

FIG. 3 is an exemplary procedure diagram illustrating a NIDD authorisation update procedure. As shown in FIG. 3, the NIDD authorisation update procedure includes following steps.

In step S301, a management function node, such as the home subscriber server (HSS) 104, may send an NIDD Authorisation Update Request message to the SCEF 101 to update a user's NIDD authorisation. In step S302, the SCEF 101 sends an NIDD Authorisation Update Response (cause) message to the HSS 104 to acknowledge the authorisation update. In step S303, the SCEF 101 informs the SCS/AS 102 that the User's authorisation status has changed by sending an NIDD Authorisation Notification Request message to the SCS/AS. In step S304, the SCS/AS 102 responds to the SCEF 101 with an NIDD Authorisation Notification Response. Without limitation to the present disclosure, other detailed examples about MT NIDD procedure may be also found in clause 5.13.8 in a 3rd Generation Partnership Project Technical Specification (3GPP TS) 23.682 V16.0.0 (Release 16).

In embodiments of the present disclosure, if the message indicates a NIDD configuration status about the terminal device, such as the authorisation status, the message may be named as "NiddConfigurationStatusNotification", as in 3GPP TS 29.122 V15.1.0 (Release 15). In embodiments of the present disclosure, a definition of the "NiddConfigurationStatusNotification" is further illustrated as in the following table. The message may be sent in step S303.

TABLE 2

Definition of "NiddConfigurationStatusNotifiation"

| Attribute name | Data type | Cardinality | Description |
| --- | --- | --- | --- |
| niddConfiguration | Link | 1 | Link to the NIDD configuration resource to which this notification is related. |
| externalId | ExternalId | 0 . . . 1 | Each element uniquely identifies a user. |
| msisdn | Msisdn | 0 . . . 1 | Each element identifies the Mobile Subscriber (MS) internal Public Switched Telephone Network (PSTN)/Integrated Services Digital Network (ISDN) number allocated for a UE. |
| status | NiddStatus | 1 | Indicates the NIDD configuration status. |
| rdsIndication | boolean | 0 . . . 1 | It indicates whether a reliable data service acknowledgement is used or not. |

As shown in the table 2, besides the NIDD configuration, the information element (ID) of "rdsIndication" is also included to notify the application function node, such as the SCS/AS 102, about a reliable data service (RDS) configuration of the network.

Particularly, in embodiments of the present disclosure, the message includes information about whether the terminal device enforces the RDS, if the message indicates the NIDD status.

It is an advantage that existing procedure and message may be utilized directly or only with minor modification in the embodiments. Thus, extra radio or time cost may be minimized.

Figure 4:
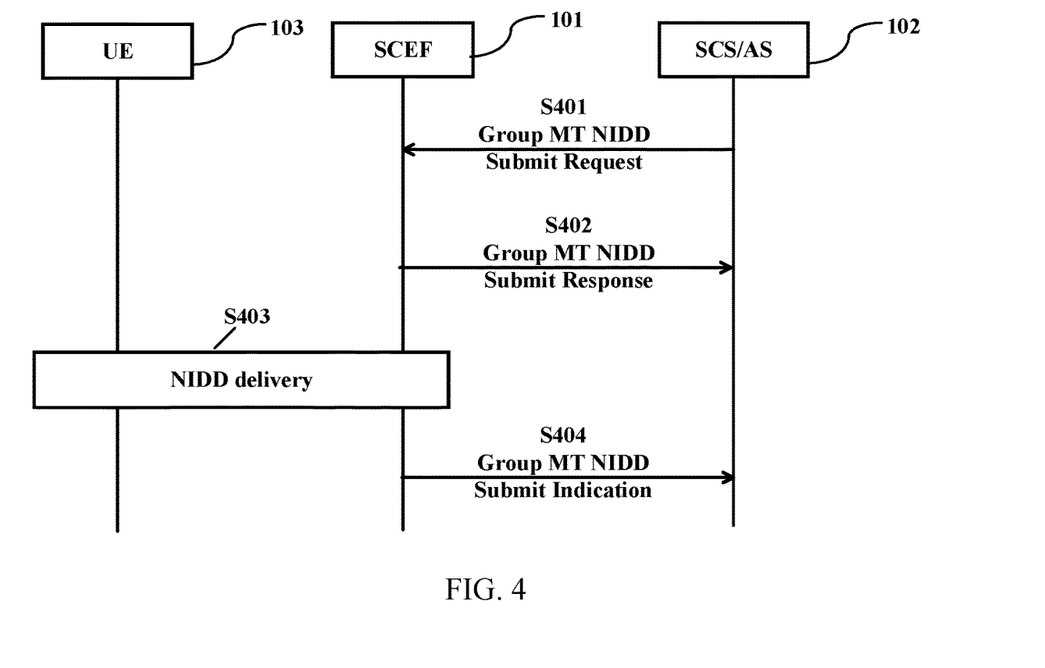
FIG. 4 is an exemplary procedure diagram illustrating a procedure of Mobile Terminated NIDD for a group of UEs.

FIG. 4 is an exemplary procedure diagram illustrating a procedure of Mobile Terminated NIDD for a group of UEs. As shown in FIG. 4, the procedure of Mobile Terminated NIDD for a group of UEs includes following steps.

In step S401, the SCS/AS 102 sends a Group MT NIDD Submit Request message to the SCEF 101. In step S402, based on the preceding NIDD Configuration of the UE Group and the SCEF stored list of authorized External Identifiers associated to the External Group Identifier, the SCEF sends a single Group MT NIDD Submit Response (Cause) message to the SCS/AS to acknowledge acceptance of the Group MT NIDD Submit Request. In step S403, NIDD delivery for each UE in the UE Group is performed. In step S404, after executing step S403 for all UEs, the SCEF sends an aggregated response message Group MT NIDD Submit Indication. Without limitation to the present disclosure, other detailed examples about MT NIDD procedure may be also found in clause 5.5.3 in a 3rd Generation Partnership Project Technical Specification (3GPP TS) 23.682 V16.0.0 (Release 16).

In embodiments of the present disclosure, if the message indicates NIDD group data delivery status, the message may be named as "GmdResult", as in 3GPP TS 29.122 V15.1.0 (Release 15). In embodiments of the present disclosure, a definition of the "GmdResult" is further illustrated as in the following table. The message may be sent in step S404.

TABLE 3

Definition of "GmdResult"

| Attribute name | Data type | Cardinality | Description |
| --- | --- | --- | --- |
| externalId | ExternalId | 0 . . . 1 | Each element uniquely identifies a user. |
| msisdn | Msisdn | 0 . . . 1 | Each element identifies the MS internal PSTN/ISDN number allocated for a UE. |
| deliveryStatus | DeliveryStatus | 1 | Indicates the MT NIDD delivery status. |
| rdsIndication | boolean | 0 . . . 1 | It indicates whether a reliable data service acknowledgement is used or not. |
| requestedRetransmissionTime | DateTime | 0 . . . 1 | Identifies the absolute time at which the UE will be reachable. This parameter may be supplied by the SCEF for delivery status "FAILURE_TEMORARILY_NOT_REACHABLE" |

As shown in the table 3, besides the NIDD delivery status, the information element (ID) of "rdsIndication" is also included to notify the application function node, such as the SCS/AS 102, about a reliable data service (RDS) configuration of the network.

Particularly, in embodiments of the present disclosure, the message includes information about whether each terminal device of the plurality of the terminal devices enforces the RDS, if the message indicates the NIDD group data delivery status.

It is an advantage that existing procedure and message may be utilized directly or only with minor modification in the embodiments. Thus, extra radio or time cost may be minimized.

Further, in embodiments of the present disclosure, these messages above illustrated with FIGS. 2-4 may a hyper text transfer protocol (HTTP) POST message, such as POST response, or POST request.

Figure 5A:
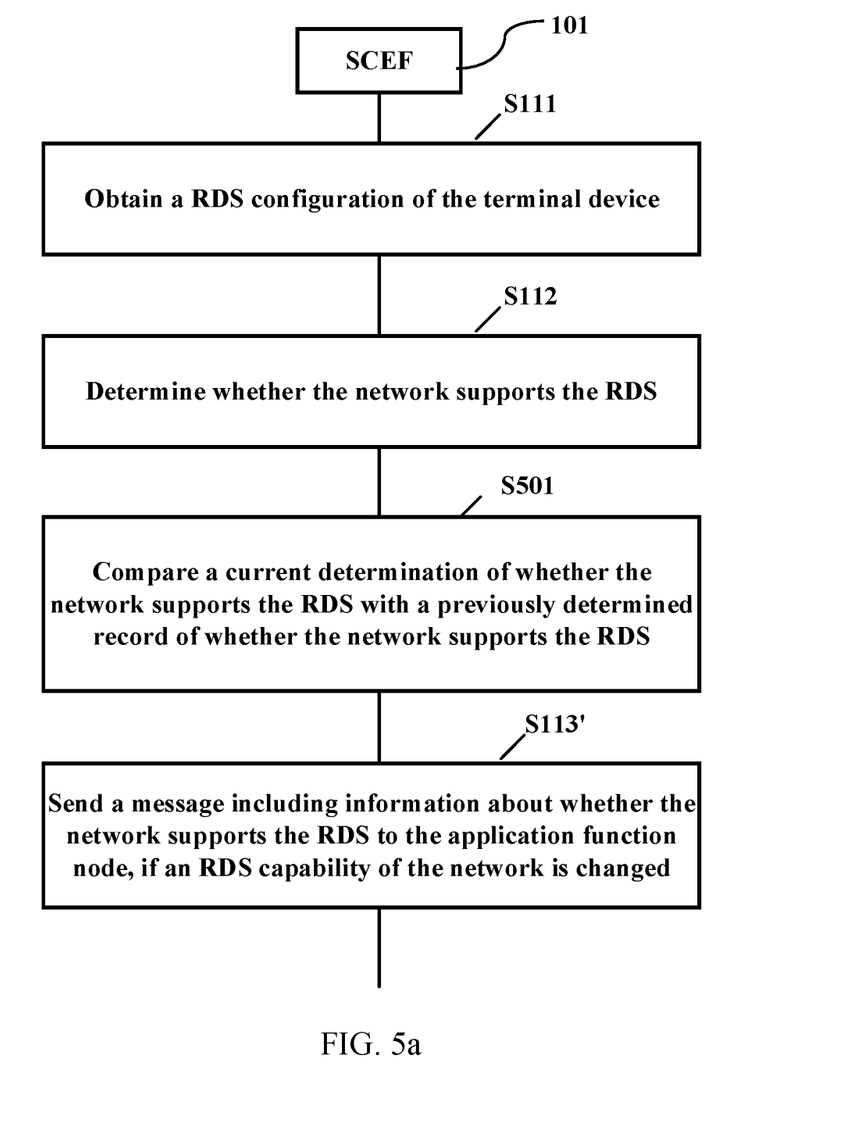
FIG. 5a is an exemplary procedure diagram illustrating other step of the method as shown in FIG. 1.

FIG. 5a is an exemplary procedure diagram illustrating other step of the method as shown in FIG. 1.

In embodiments of the present disclosure, the method further includes: step S501, comparing a current determination of whether the network supports the RDS with a previously determined record of whether the network supports the RDS based on RDS capability of both the terminal device and the exposure function node. The exposure function node sends the message, if a comparison shows that RDS capability of the network is changed (e.g., if the current determination is different with the previously determined and stored record).

Therefore, the method may include: step S111, obtaining an RDS configuration of the terminal device; step S112, determining whether the network supports the RDS; step S501, comparing a current determination of whether the network supports the RDS with a previously determined record of whether the network supports the RDS; and step S113', sending a message including information about whether the network supports the RDS to the application function node, if a comparison shows that RDS capability of the network is changed (e.g., if the current determination is different with the previously determined and stored record).

It is an advantage that the exposure function node may always notify the application function node with the newly updated configuration. For example, the application function node might previously obtain information whether the SCEF, rather than the network, supports the RDS, while the UE is not connected to the network yet. The application function node might transmit data with improper RDS configuration, only based on this incomplete information. The timely update about the RDS configuration of the network will avoid such risk. The change of the connection status of the terminal device, or the change of the RDS configuration of the terminal device or the exposure function node will be timely notified to the application function node.

Figure 5B:
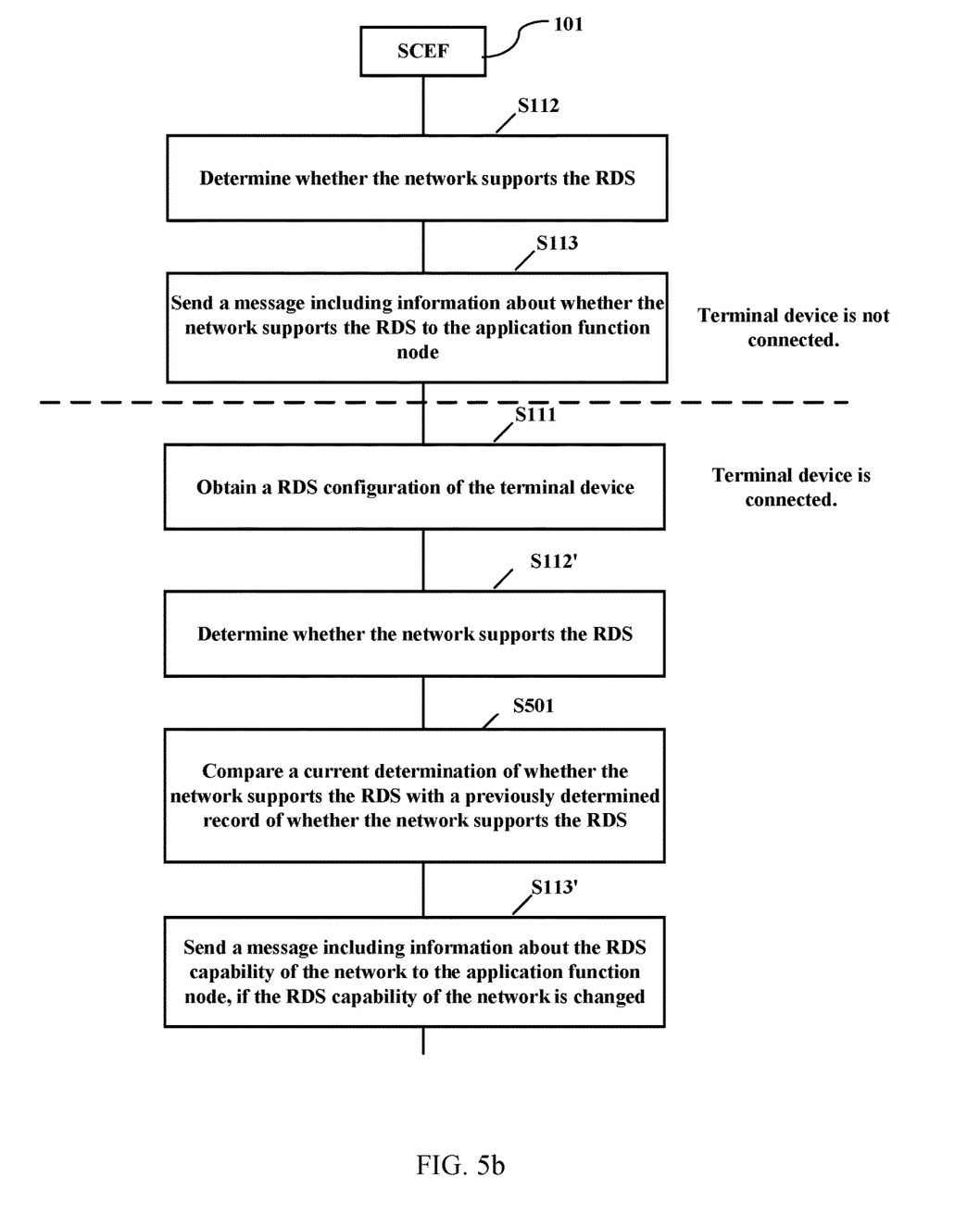

FIG. 5b is a diagram showing an exemplary implementation procedure for the method as shown in FIG. 5a.

As shown in FIG. 5b, in embodiments of the present disclosure, the method may comprises: determining an RDS capability of a network, indicating a support for RDS; sending a message including information about the RDS capability of the network to an application function node; obtaining an RDS configuration of a terminal device if the terminal device is connected, wherein the RDS configuration of the terminal device indicates no support for RDS; determining that the capability of the network is changed, based on the RDS configuration of the exposure function node, and the RDS configuration of the terminal device; and sending a message including information about the changed RDS capability of the network to the application function node.

Particularly, in this exemplary implementation procedure, firstly, a terminal device, such as a UE, is not connected (for RDS) yet, and the SCEF 101 determines whether the network supports the RDS in step S112.

In the step S112, the SCEF 101 may determine that the network support the RDS, based on an RDS configuration of the exposure function node, if the terminal device is not connected.

Such determination may be optional. For example, based on different local policy of default configuration for the absence of the UE, the SCEF 101 may alternatively determine that the network does not support the RDS, if the UE is not connected yet.

In step S113, the SCEF 101 may send a message including information about that the network supports RDS, while the terminal device is not connected.

In step S111, the SCEF 101 obtains an RDS configuration/capability of the terminal device, while the terminal device is connected. The terminal device may indicate no support for RDS. Additionally, the step S111, obtaining an RDS configuration of the terminal device may comprises obtaining a non-connection state of the terminal device, if the terminal device is not connected.

In S112', the SCEF 101 determines that the network does not support RDS, based on the RDS configuration (no support) of the terminal device and an RDS configuration (support) of the SCEF 101.

In step S501, the SCEF 101 compares a current determination of no RDS support with a previously determination of RDS support, and finds out that the RDS capability is changed based on the difference between the two determinations.

In step 113', the SCEF 101 sends a message including information about whether the network supports the RDS to the application function node. For example, the SCEF 101 shall send an HTTP POST message to notify the SCS/AS that the NIDD status is active and RDS capability indication. In step 113', the RDS capability indication may indicate "no support".

It should be understood, the above change of the RDS capability due to the connection state of the terminal device is only an example. Namely, the RDS capability may be changed due to any other change of RDS configuration of arrangement in the network.

Further, it should be understood, the RDS capability may be alternatively changed from supporting RDS to not supporting RDS. For example, when a terminal device which supports the RDS is disconnected, the RDS capability of the network is changed from supporting RDS to not supporting RDS.

Figure 5C:
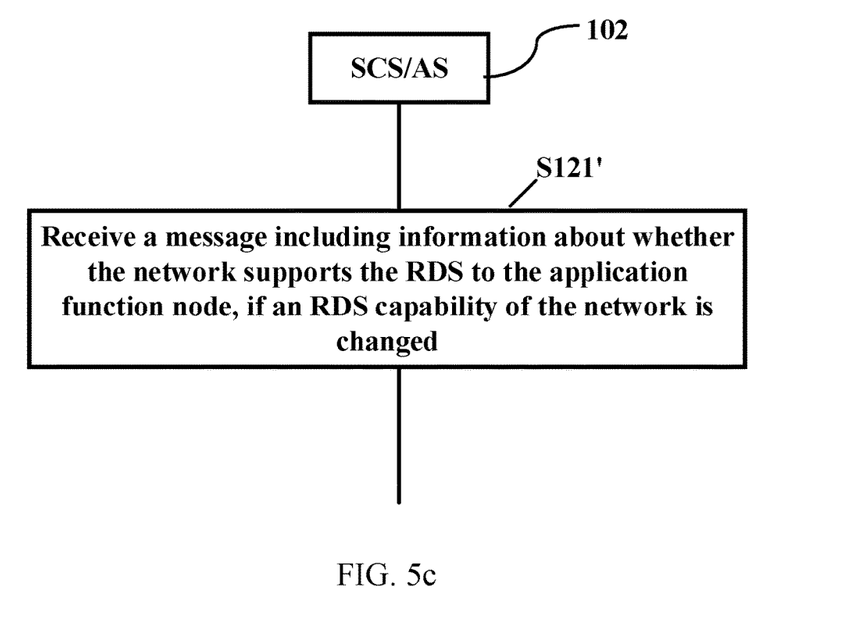
FIG. 5c is another exemplary procedure diagram illustrating other step of the method as shown in FIG. 1.

FIG. 5c is another exemplary procedure diagram illustrating other step of the method as shown in FIG. 1. As shown in FIG. 5, the method implemented at an application function node comprising: step S121', receiving, from an exposure function node, a message including information about an RDS capability of a network, if the RDS capability of the network is changed. The step S121' corresponds to step S113' in FIG. 5a, 5b.

In summary, if the RDS capability is changed, e.g. when a T6a/b PDN connection is established, the UE indicates no support for RDS but the SCEF previously indicated RDS is supported to the SCS/AS in the NIDD configuration procedure, the SCEF shall send an HTTP POST message to notify the SCS/AS that the NIDD status is active and RDS capability indication. The SCS/AS shall acknowledge the request with an HTTP 200 OK or 204 No Content response.

Further, for the purpose of next comparing, the current determination may be stored as a new record.

It is also an advantage that, the same status of the network needs not to be repeatedly notified to the application function node, and thus the radio and/or time cost may be further reduced.

Figure 6:
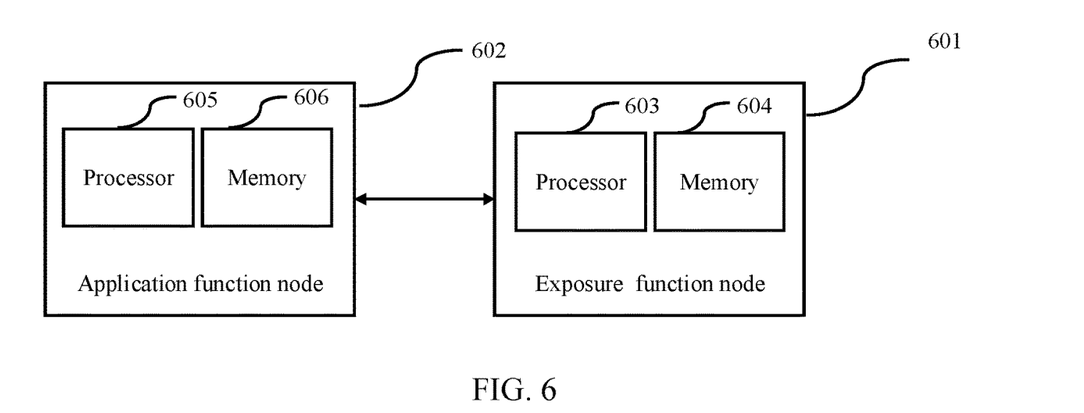
FIG. 6 is a block diagram showing the exposure function node and the application function node in accordance with embodiments of the present disclosure.

FIG. 6 is a block diagram showing the exposure function node and the application function node in accordance with embodiments of the present disclosure.

As shown in FIG. 6, there is provided an exposure function node 601, including: a processor 603; and a memory 604, containing instructions executable by the processor 603. The exposure function node 601 is operative to: obtain a reliable data service (RDS) configuration of a terminal device; determine whether the network supports the RDS; and send a message including information about whether the network supports the RDS to an application function node.

Particularly, the exposure function node may be operative to: determine an RDS capability of a network; and send a message including information about the RDS capability of the network to an application function node, if the RDS capability of the network is changed.

In embodiments of the present disclosure, the exposure function node 601 is operative to any of the methods above mentioned, such as shown in FIG. 1 and FIG. 5.

Further, there is provided an application function node 602, including: a processor 605; and a memory 606, containing instructions executable by the processor 605. The application function node 602 is operative to: receive, from an exposure function node, a message including information about whether the network supports the RDS.

Particularly, the application function node may be operative to: receive, from an exposure function node, a message including information about an RDS capability of a network, if the RDS capability of the network is changed.

In embodiments of the present disclosure, the application function node 602 is operative to any of the methods above mentioned, such as shown in FIG. 1.

In FIG. 6, the processor 603 and the processor 605 may be any kind of processing component, such as one or more microprocessor or microcontrollers, as well as other digital hardware, which may include digital signal processors (DSPs), special-purpose digital logic, and the like. The memory 604 and the memory 606 may be any kind of storage component, such as read-only memory (ROM), random-access memory, cache memory, flash memory devices, optical storage devices, etc.

Figure 7:
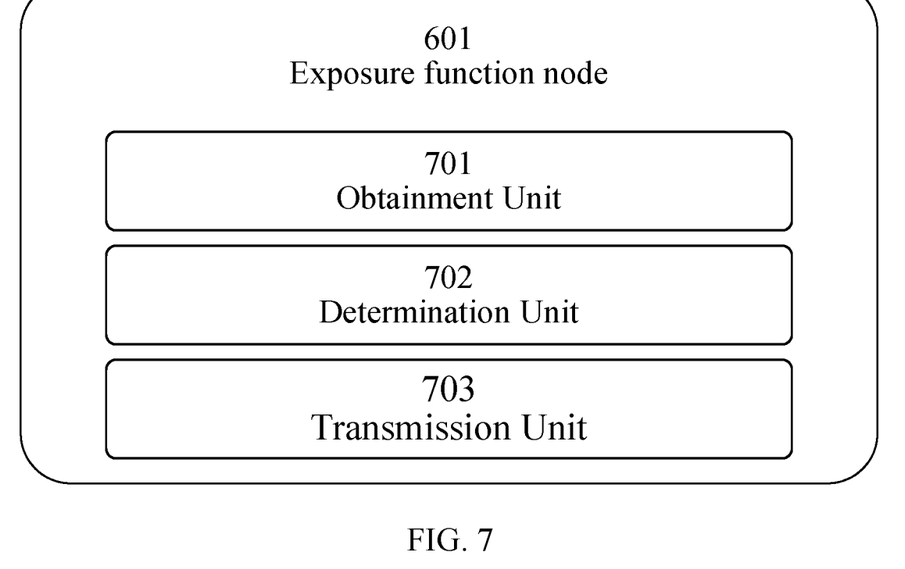
FIG. 7 is a schematic showing function units of exposure function node in accordance with embodiments of the present disclosure.

FIG. 7 is a schematic showing function units of exposure function node in accordance with embodiments of the present disclosure.

As shown in FIG. 7, there is provided an exposure function node 601, including: an obtainment unit 701, configured to obtain an RDS configuration of a terminal device; a determination unit 702, configured to determine whether the network supports the RDS; and a transmission unit 703, configured to send a message including information about whether the network supports the RDS to an application function node.

Particularly, the transmission unit 703 is configured to send a message including information about the RDS capability of the network to an application function node, if the RDS capability of the network is changed.

In embodiments of the present disclosure, the exposure function node 601 is operative to any of the methods above mentioned, such as shown in FIG. 1 and FIG. 5.

Figure 8:
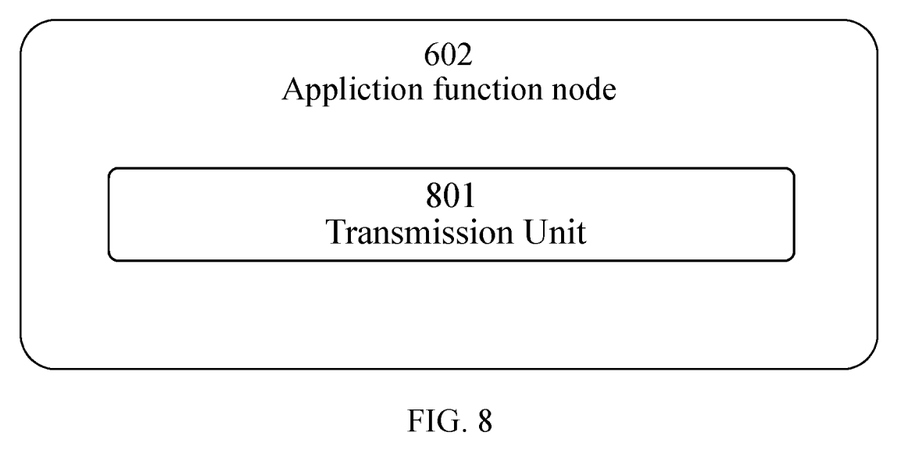
FIG. 8 is a schematic showing function units of the application function node in accordance with embodiments of the present disclosure.

FIG. 8 is a schematic showing function units of the application function node in accordance with embodiments of the present disclosure.

As shown in FIG. 8, there is provided an application function node 602, including: a transmission unit 801, configured to receive, from an exposure function node, a message including information about whether the network supports the RDS.

Particularly, the transmission unit 801 is configured to receive, from an exposure function node, a message including information about an RDS capability of a network, if the RDS capability of the network is changed.

In embodiments of the present disclosure, the application function node 602 is operative to any of the methods above mentioned, such as shown in FIG. 1.

With function units as shown in FIG. 7 and FIG. 8, the exposure function node and application function node may not need a fixed processor or memory, any computing resource and storage resource may be arranged from at least one node device in the network. The introduction of function units may improve the usage efficiency of the network resources and the flexibility of the network.

Figure 9:
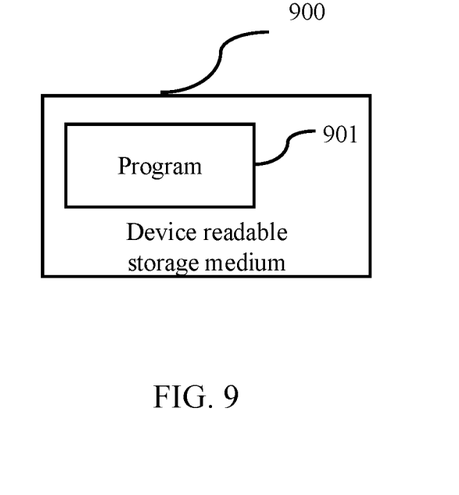
FIG. 9 is a schematic showing computer readable storage medium in accordance with embodiments of the present disclosure.

FIG. 9 is a schematic showing computer readable storage medium in accordance with embodiments of the present disclosure. As shown in FIG. 9, there is provided a device readable storage medium 901 having a program 902 stored thereon, wherein the program 902 is executable by a device to cause the device to carry out any of the methods above mentioned, such as in FIG. 1 and FIG. 5.

According to the present disclosure, the exposure function node sends message to notify the application function node about a reliable data service (RDS) configuration of the network, upon the obtainment of the RDS configuration from the terminal device. It is an advantage that data transmissions of the application function node with improper configuration may be avoided.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method implemented at an exposure function node, comprising:
   determining a Reliable Data Service (RDS) capability of a network, wherein the RDS capability of the network indicates whether the network supports the RDS;
   sending a first message including information about the RDS capability of the network to an application function node;
   obtaining an RDS configuration of a terminal device when the terminal device is connected, wherein the RDS configuration of the terminal device indicates no support for RDS;
   determining that the capability of the network is changed, based on the RDS configuration of the exposure function node, and the RDS configuration of the terminal device; and
   sending a second message including information about the changed RDS capability of the network to the application function node.

* * * * *